United States Patent Office 3,578,390
Patented May 11, 1971

3,578,390
METHOD OF REMOVING SULFUR DIOXIDE FROM GASES CONTAINING THE SAME
Martin Kruel, Essen-Bergerhausen, Harald Juentgen, Essen-Heisingen, and Heinrich Drwatwa, Rheinhausen, Germany, assignor to Bergwerksverband GmbH, Essen, Germany
No Drawing. Continuation of application Ser. No. 739,902, June 13, 1968. This application May 27, 1969, Ser. No. 828,815
Claims priority, application Germany, Sept. 16, 1965, B 83,755
Int. Cl. B01d 47/00
U.S. Cl. 23—2                                    14 Claims

ABSTRACT OF THE DISCLOSURE

Sulfur dioxide is removed from gases containing the same, particularly steam and oxygen-containing waste gas, by intimately contacting such gas and an adsorbent material consisting essentially of a porous carbonaceous material which is impregnated with an ammonium or alkali metal iodide or iodate. The contacting is carried out at an elevated temperature which may be up to 200° C. and preferably is at least as high as 100° C.

---

This application is a continuation of Ser. No. 739,902, filed June 13, 1968, and now abandoned which is a continuation of Ser. No. 578,486 filed Sept. 12, 1966, and now abandoned.

The present invention relates to a method of removing sulfur dioxide from gases containing the same and, more particularly, the present invention is concerned with effectively removing sulfur dioxide from flue gases and other industrial waste gases by means of carbonaceous adsorbent material.

Conventionally, the sulfur dioxide-containing gas is passed through an adsorbent, porous, carbonaceous mass of particulate material whereby the sulfur dioxide is first adsorbed at the carbonaceous material such as activated carbon, coke or the like, and the thus adsorbed sulfur dioxide may then be oxidized to sulfur trioxide by reaction with free oxygen contained in the waste gas or the like. Since the waste gases generally also contain at least some steam, the thus formed sulfur trioxide will react immediately with steam under formation of sulfuric acid.

It has also been proposed to first catalytically oxidize sulfur dioxide to sulfur trioxide, thereby forming sulfuric acid in the waste gases and thereafter to bind the thus formed sulfuric acid to a carbonaceous material.

Upon subsequent heating of the adsorbent carbonaceous material at a temperature above 400° C., the bound sulfuric acid is reduced to sulfur dioxide and the latter simultaneously expelled from the adsorbent material. Thereby, the adsorbent material such as activated carbon is reactivated. However, it is also possible to remove the sulfuric acid from the adsorbent material by washing with water, particularly with ammonia-containing water.

It is an object of the present invention to improve the above-described processes for removal of sulfur dioxide from gases, particularly industrial waste gases, containing the same.

It is another object of the present invention, to increase the degree of desulfurization or removal of sulfur dioxide achieved by passing of waste gases or the like through a carbonaceous adsorbent material.

It is further an object of the present invention, to increase the useful life span of the adsorbent, i.e., the amount of sulfur dioxide-containing gas which may be desulfurized by being passed through the adsorbent material before the latter has to be reactivated.

Other objects and advantages of the present invention will become apparent from a further reading of the description and of the appended claims.

With the above and other objects in view, the present invention contemplates a method of removing sulfur dioxide from gas containing the same, which method comprises the step of causing intimate contact between the sulfur dioxide-containing gas and an adsorbent material consisting essentially of a porous, carbonaceous material impregnated with a substance selected from the group consisting of ammonium and alkali metal iodides and iodates.

Impregnation of the carbon-containing adsorbent material may be caired out in different manners. For instance, the adsorbent, particular, porous, carbonaceous material may be immersed in a solution of the respective ammonium or alkali metal iodide and/or iodate, or the particulate adsorbent material may be sprayed with such solution.

However, impregnation of the adsorbent carbonaceous material with solutions of the iodide and/or iodate may also be carried out under a partial vacuum, after thorough drying and degassing of the carbonaceous adsorbent material. The latter method, which per se is known for impregnating porous materials, is particularly advantageous because it will cause the iodide or iodate solution to penetrate very deeply into the pores of the carbonaceous adsorbent material, so that a substantially even covering of the inner surface of the pores of the adsorbent material with the catalyst, i.e., the iodide or iodate or a mixture thereof will be achieved.

The adsorption of sulfur dioxide from sulfur dioxide-containing gas, particularly industrial waste gases, on the thus impregnated adsorbent material preferably may be carried out at temperatures of between 60 and 200° C. and most preferably within a temperature range of between about 100 and 150° C.

The proportion of ammonium and/or alkali metal iodide and/or iodate which is to be applied to the carbonaceous adsorbent material may vary between wide limits but generally will be so chosen that the iodide or iodate will form between 0.1 and 15% by weight of the thus impregnated adsorbent material. The optimum proportion of iodide or iodate depends also on the specific type of carbonaceous adsorbent material. Preferred proportion will be found in the tables below.

Carbonaceous adsorbent materials are well known to those skilled in the art. Preferably, the ammonium and/or alkali metal iodide and/or alkali iodate is applied to activated carbons of various origin, such as activated mineral coals or charcoals, peat coke or coke produced from hard or soft coal. It is particularly advantageous to use such activated carbonaceous materials which are produced by heating mineral coal in contact with air at temperatures of between 200 and 300° C., such as so-called oxidized hard coals.

The regeneration of the impregnated adsorbent material of the present invention after the same has been charged with sulfur compounds, may be carried out by treatment with steam or washing with hot water. Although the ammonium and alkali metal iodides and iodates are partially water soluble, it has been surprisingly found that the treatment of the impregnated carbonaceous adsorbent material with steam or water for the purpose of expelling sulfur compounds therefrom will result only in insignificant losses of the impregnating substance.

It is preferred, however, to carry out the regeneration of the impregnated adsorbent material by means of ammonia-containing water. It is possible thereby, without doing damage to the catalyst, i.e., the iodide or iodate, or the impregnated adsorbent material, to obtain concentrated solutions of ammonium sulfate which may contain up to between 25 and 30% by weight of ammonium sulfate.

The method of the present invention may be carried out by passing the sulfur dioxide-containing waste gases through containers or towers in which the impregnated adsorbent material is maintained. The adsorbent material may be arranged as a stationary layer, as a layer which moves in axial direction through the tower or the like, as a fluidized bed or also as dispersed solids.

Generally, it has been found advantageous to carry out the adsorption of sulfur dioxide by having the impregnated carbonaceous adsorbent material pass slowly in downward direction through a tower and, simultaneously, to pass the sulfur-dioxide-containing waste gases in countercurrent, i.e., in upward direction, through the downwardly moving adsorbent material. In any event, it is advantageous to use abrasion-resistant adsorbent materials, such as are commercially available, for instance, in the form of carbonaceous adsorbent materials which were produced with pitch as a binding agent.

In Tables I and II are described, by way of example only and without limiting the invention to the specific details shown in the tables, the degree of desulfurization which can be achieved over different periods of time with activated carbons and cokes of different origin with and without the catalyst, i.e., the iodide or iodate impregnant of the present invention.

The experiments or examples which are tabulated below were all carried out by passing a waste gas which contained 0.3% by volume of sulfur dioxide, 3% by volume of oxygen and 6% by volume of steam at different temperatures at a rate of 80 liters per hour through a tube having an inner diameter of 16 millimeters. The tube was filled with 100 cm.$^3$ of the impregnated adsorbent consisting of particles having a size of between 1 and 2 millimeters and forming a layer having a height of 50 cm. within the tube. The speed of flow was 10 cm./sec., corresponding to a contact time of 5 seconds between the waste gases and the layer of adsorbent material. The sulfur dioxide concentration in the waste gases was continuously determined at points immediately before entering and immediately after leaving the adsorbent layer, and the degree of desulfurization by passage through the layer of the respective impregnated carbonaceous adsorbent was calculated from the difference between the sulfur dioxide content of the waste gas upon entering and upon leaving the column of adsorbent material.

TABLE I

| Temperature, °C. | Adsorbent material | Catalyst composition, percent by weight | Degree of desulfurization achieved after operation for (hours)— | | | | | |
|---|---|---|---|---|---|---|---|---|
| | | | 0.5 | 2 | 6 | 10 | 15 | 20 |
| | | | Percent | | | | | |
| 80 | Activated carbon made of oxidized hard coal, 1-2 mm | 0.0 | 100 | 100 | 92 | 80 | 64 | 54 |
| | | Plus 1.0 potassium | 100 | 100 | 100 | 100 | 97 | 75 |
| | | Plus 5.0 iodide | 100 | 100 | 100 | 100 | 100 | 92 |
| 100 | Peat coke, 0.5-2 mm | 0.0 | 100 | 44 | 42 | 40 | 38 | |
| | | Plus 0.1 potassium | 100 | 100 | 99 | 95 | 86 | 66 |
| | | Plus 0.5 iodide | 100 | 100 | 100 | 100 | 100 | 91 |
| | | Plus 15.0 iodide | 100 | 100 | 100 | 100 | 100 | 100 |
| 120 | Activated carbon made of charcoal 0-2 mm | 0.0 | 77 | 59 | 59 | 49 | 39 | 33 |
| | | Plus 0.1 ammonium | 100 | 98 | 91 | 76 | 46 | 23 |
| | | Plus 0.5 iodide | 100 | 100 | 100 | 100 | 73 | 30 |
| | | 0.0 sodium | 100 | 37 | 32 | 28 | | |
| | | Plus 2.0 iodide | 100 | 100 | 100 | 80 | 50 | |
| 160 | Activated carbon made of anthracite, 0-2 mm | 0.0 | 45 | 32 | 23 | | | |
| | | Plus 1.2 potassium iodide | 100 | 97 | 55 | 20 | | |
| 160 | Activated carbon made of coconut shells, 1-2 mm | 0.0 | 63 | 47 | 30 | 23 | 19 | 16 |
| | | Plus 1.0 potassium | 100 | 87 | 58 | 20 | 18 | 16 |
| | | Plus 5.0 iodide | 100 | 100 | 60 | 27 | 17 | 15 |

TABLE II

| Temperature, °C. | Adsorbent material | Catalyst composition, percent by weight | Degree of desulfurization achieved after operation for (hours)— | | | | | |
|---|---|---|---|---|---|---|---|---|
| | | | 0.5 | 2 | 6 | 10 | 15 | 20 |
| | | | Percent | | | | | |
| 80 | Activated carbon made of oxidized hard coal, 1-2 mm | 0.0 | 100 | 97 | 92 | 80 | 64 | 54 |
| | | Plus 0.1 sodium | 100 | 100 | 100 | 100 | 100 | 86 |
| | | Plus 0.5 iodate | 100 | 100 | 100 | 100 | 100 | 97 |
| | | Plus 10.0 iodate | 100 | 100 | 100 | 100 | 100 | 100 |
| 100 | Peat coke, 0.5-2 mm | 0.0 | 100 | 44 | 42 | 40 | 38 | |
| | | Plus 0.1 sodium | 100 | 100 | 100 | 92 | 75 | 60 |
| | | Plus 0.25 iodate | 100 | 100 | 100 | 100 | 97 | 75 |
| | | Plus 1.6 iodate | 100 | 100 | 100 | 100 | 100 | 90 |
| 120 | Activated carbon made of charcoal, 0-2 mm | 0.0 | 77 | 59 | 59 | 49 | 39 | 33 |
| | | Plus 1.0 potassium | 100 | 92 | 88 | 73 | 31 | 17 |
| | | Plus 5.0 sodium iodate | 100 | 100 | 100 | 100 | 67 | 21 |
| 160 | Activated carbon made of coconut shells, 1-2 mm | 0.0 | 63 | 47 | 30 | 23 | 19 | 16 |
| | | Plus 1.0 potassium | 100 | 86 | 53 | 24 | 18 | 15 |
| | | Plus 1.0 iodate | 100 | 100 | 59 | 43 | 17 | 15 |
| | | Plus 5.0 iodate | 100 | 100 | 87 | 43 | 25 | |
| | | Plus 10.0 iodate | 100 | 100 | 100 | 56 | 18 | 17 |

Tables I and II show clearly that the absorptive capacity of the various activated carbonaceous materials with respect to the adsorption of sulfur dioxide is greatly increased by impregnating the carbonaceous material with the ammonium and/or alkali metal iodides or iodates in accordance with the present invention. By proceeding in accordance with the present invention, the degree of desulfurization achieved is 100% for a long period of time, even at considerably elevated temperatures. In other words, the entire sulfur dioxide of the waste gases down to the minimum which is analytically determinable, i.e., down to $10^{-4}$% by volume, is adsorbed. On the other hand, by utilizing the same type of adsorbent carbonaceous material but without impregnation of the same with iodide or iodate as proposed according to the present invention, the degree of desulfurization drops sharply after a relatively short period of time.

The time period after which the adsorbent material is no longer capable of preventing passage of the entire sulfur dioxide content of the waste gas is lengthened in accordance with the present invention to many times the time period for which the untreated carbonaceous material is capable of preventing passage of sulfur dioxide therethrough.

The following example is also given as illustrative only and without limiting the invention to specific details thereof.

EXAMPLE 15 m.³/h. flue gases derived from an oil heated furnace are passed through an adsorptive tower containing 9 liters of activated carbon. Operating temperature in the tower is 120° C. and the average residence time of the gas in the tower equals 2.5 seconds.

The sulfur dioxide concentration of the flue gases fluctuates between 800 and 1000 p.p.m., i.e., between 0.08 and 0.1% by volume.

The desulfurization which is achieved under these conditions with conventional activated carbon and with impregnated carbon in accordance with the present invention, is summarized in Table III.

The data given in Table III show the highly significant improvement of the adsorptive active achieved by impregnating the carbonaceous adsorbent in accordance with the present invention. For instance, a sulfur dioxide load of up to between 20 and 25% of the weight of the adsorbent can be achieved in accordance with the present invention while still retaining all, or at least a very substantial portion, of the sulfur dioxide in the impregnated absorbent.

TABLE III

| Temperature, °C. | Activated carbon made of— | Catalyst, percent by weight | Degree of desulfurization after operating for (hours)— | | | | | | Percent SO₂ retained by absorbent |
|---|---|---|---|---|---|---|---|---|---|
| | | | 0.5 | 2 | 6 | 10 | 15 | 20 | |
| | | | Percent | | | | | | |
| 120 | Mineral coal | Without catalyst | 77 | 71 | 61 | 46 | | | |
| | | 1 J⁻ | 100 | 100 | 91 | 92 | 91 | 86 | 19.4 |
| | | 1 JO₃⁻ | 100 | 100 | 89 | 80 | 77 | 76 | 20.6 |
| | | 5 J⁻ | 100 | 100 | 100 | 100 | 100 | 100 | 26.8 |

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. The method of removing sulfur dioxide from gases containing the same, comprising the step of causing intimate contact at a temperature between 100° C. and below 200° C., between said sulfur dioxide-containing gas and an adsorbent material consisting essentially of a porous carbonaceous material impregnated with a substance selected from the group consisting of ammonium and alkali metal iodides and iodates and regenerating said adsorbent material by treating the same with an ammonia-containing aqueous solution to prepare it for reuse in the process of the invention.

2. A method as defined in claim 1, wherein said sulfur dioxide-containing gas is a steam and oxygen-containing waste gas, and wherein said waste gas is passed through said adsorbent material.

3. A method as defined in claim 2, wherein said waste gas is a flue gas.

4. A method as defined in claim 2, wherein said waste gas is passed through a stationary layer of said adsorbent material.

5. A method as defined in claim 2, wherein said adsorbent material moves in countercurrent to the waste gas passing therethrough.

6. A method as defined in claim 2, wherein said waste gas passes through a fluidized bed of said adsorbent material.

7. A method as defined in claim 2, wherein said waste gas is passed through said adsorbent material at a temperature of between 100° C. and 160° C.

8. A method as defined in claim 1, wherein the contacting of said gas and said adsorbent material is carried out at an elevated temperature between 100° C. and 150° C.

9. A method as defined in claim 1, wherein said porous carbonaceous material is impregnated with an amount of said substance equal to between about 0.1 and 15% of the combined weight of said carbonaceous material and said substance.

10. A method as defined in claim 1, wherein said carbonaceous material is selected from the group consisting of activated mineral coal, activated charcoal and peat coke.

11. A method as defined in claim 1, wherein said substance is selected from the group consisting of ammonium iodide, sodium iodide, potassium iodide, sodium iodate and potassium iodate.

12. A method as defined in claim 1, wherein said sulfur dioxide-containing gas is a flue gas and the impregnated adsorbent material contains between about 0.1% and 15% by weight of said substance.

13. A method as defined in claim 1, wherein said temperature is about 120° C.

14. A method as defined in claim 1, wherein said temperature is so chosen as to cause substantial desulfurization of said sulfur-dioxide-containing gas within a period of time of the magnitude of seconds.

References Cited

UNITED STATES PATENTS 3,284,158  11/1966  Johswich _____ 23—178
3,294,487  12/1966  Pauling _____ 23—168

REUBEN FRIEDMAN, Primary Examiner

C. N. HART, Assistant Examiner

U.S. Cl. X.R.

23—119, 178; 55—73